(12) United States Patent
Jennings et al.

(10) Patent No.: US 6,438,129 B1
(45) Date of Patent: Aug. 20, 2002

(54) RESTRICTION OF SOURCE ADDRESS LOOK-UPS IN NETWORK

(75) Inventors: Kevin Jennings; Edele O'Malley, both of Dublin; John Hickey, County Meath, all of (IE)

(73) Assignee: 3Com Technologies, Georgetown, KY (US)

( * ) Notice: Subject to any disclaimer, the term of this patent is extended or adjusted under 35 U.S.C. 154(b) by 0 days.

(21) Appl. No.: 09/253,771

(22) Filed: Feb. 22, 1999

(30) Foreign Application Priority Data

Nov. 21, 1998 (GB) .............................................. 9825443

(51) Int. Cl.[7] .................................................. H04J 3/24
(52) U.S. Cl. ....................................... 370/392; 370/389
(58) Field of Search ................................. 370/389, 399, 370/397, 400, 401, 402, 403–407, 254, 256, 258, 452, 503, 509, 351, 352, 468, 229, 230, 221, 232, 233, 234, 235, 473, 477, 902, 909, 911, 912; 711/202, 1, 201

(56) References Cited

U.S. PATENT DOCUMENTS

| | | | |
|---|---|---|---|
| 5,060,228 A | 10/1991 | Tsutsui et al. | |
| 5,140,585 A | 8/1992 | Tomikawa | |
| 5,210,748 A | 5/1993 | Omishi et al. | |
| 5,649,109 A | 7/1997 | Griesmer et al. | |
| 5,842,224 A | * 11/1998 | Fenner | ......................... 711/201 |
| 5,860,136 A | * 1/1999 | Fenner | ........................ 711/201 |
| 6,331,983 B1 | 12/2001 | Haggerty et al. | |
| 6,335,932 B2 | 1/2002 | Kadambi | |

FOREIGN PATENT DOCUMENTS

| | | |
|---|---|---|
| EP | 0365337 A2 | 4/1990 |
| EP | 0462542 A2 | 12/1991 |

* cited by examiner

*Primary Examiner*—Dang Ton
(74) *Attorney, Agent, or Firm*—Nixon & Vanderhye P.C.

(57) ABSTRACT

A forwarding database in a network switch is established and maintained by performing a look-up for a source address read from an incoming frame to find a match between the source address in the frame and the source address in an entry which includes that source address, a port number and an age field. New entries are made if matches are not found, so that the forwarding database facilitates the dispatch of frames to destination addresses corresponding to source addresses in the table. The performance of a source address look-up is inhibited in the absence of a token, a reservoir of tokens being decremented each time a source address look-up is performed and incremented from time to time, at a selectable rate. The process facilitates the performance of a destination address look-up for every received frame by restricting the bandwidth made available for source address look-ups.

6 Claims, 2 Drawing Sheets

RESTRICTION OF SOURCE ADDRESS LOOK-UPS IN NETWORK

CROSS-REFERENCE TO RELATED APPLICATION

O'Malley et al, Ser. No. 09/253,772 filed of even date herewith (Feb. 22, 1999) entitled 'Restriction of Source Address up-dating in Network Switches' and commonly assigned herewith.

FIELD OF THE INVENTION

This invention relates to switching in packet-based or frame-based data communication systems, and particularly to the control of a look-up process in such switches.

BACKGROUND OF THE INVENTION

In a frame-based data communication system, wherein packets or frames of data are conveyed and directed under the control of, among other things, source addresses and destination addresses represented by respective data fields within the frames, it is customary to provide in a switch a database which relates source addresses obtained from frames received by the switch to other data, including a number identifying the port by which the frame was received at the switch, and preferably also the age of the relevant entry in the database. This database, customarily called 'forwarding database' is established in order to facilitate the dispatch of frames, which are usually temporarily stored in the switch, from the appropriate port or ports. Such a forwarding database is built up by a process of learning source addresses. In particular, when a frame is received by the switch, the source address is extracted from the frame and is entered into the database against the port on which it was received. Then, when some other frame arrives at the switch, destined for that particular address, the database is searched and the frame is dispatched (after queueing and arbitration if appropriate) on the port associated with that particular source address. If a frame arrives at the switch and the destination address in that frame is not found in the table of source addresses and ports, it is customary, and prescribed by transmission standards such as IEEE 802.1d, to broadcast the frame to all ports of the switch. In order to limit the incidence of broadcast traffic, it is very desirable that a forwarding database should be maintained up-to-date by a process of 'learning' all source addresses identified in frames arriving at the switch.

Ideally, for every frame received by the switch, two look-ups are performed. A necessary look-up in the forwarding table is a destination address look-up in order to determine where to send the frame. The second look-up is to determine whether the source address in a received frame is already in the forwarding database and, if not, to execute a write operation in order to make the necessary entry of the source address and the port on which the respective frame has been received.

A forwarding database is typically stored in a memory external to a switching basic owing to the substantial capacity (memory space) required for a forwarding database. The bandwidth available for operations relating to the memory depends partly on the speed at which the memory is clocked and the width of the database (i.e. the length of words permitted in the database). The bandwidth is therefore limited partly by technological feasibility.

As data rates increase, especially from the rates of ten or one hundred megabits per second customary today to one gigabit per second and beyond, the rate at which frames are received by a switch increases accordingly. The bandwidth available for operations relating to the memory may accordingly be insufficient to perform both a destination address look-up and a source address look-up for every frame received by the switch.

The present invention particularly therefore relates to the management of the rate at which source address look-ups are performed to ensure that the forwarding database is adequately maintained while performing destination address look-ups for every frame and allowing the transmission and forwarding of frames at 'wire-speed' (i.e. the data transmission rate) between network devices.

SUMMARY OF THE INVENTION

The invention is based on a process according to which the enabling of a source address look-up is dependent on the availability of a token. Preferably the supply of such tokens is made at a controllable rate. In a further aspect of the invention, the writing of an entry of a source address in the database is made dependent on a comparison of the age allotted to an existing entry in the database and a current indication of age.

Further features of the invention will be apparent from the following description with reference to the drawings.

DETAILED DESCRIPTION

Figure 1:
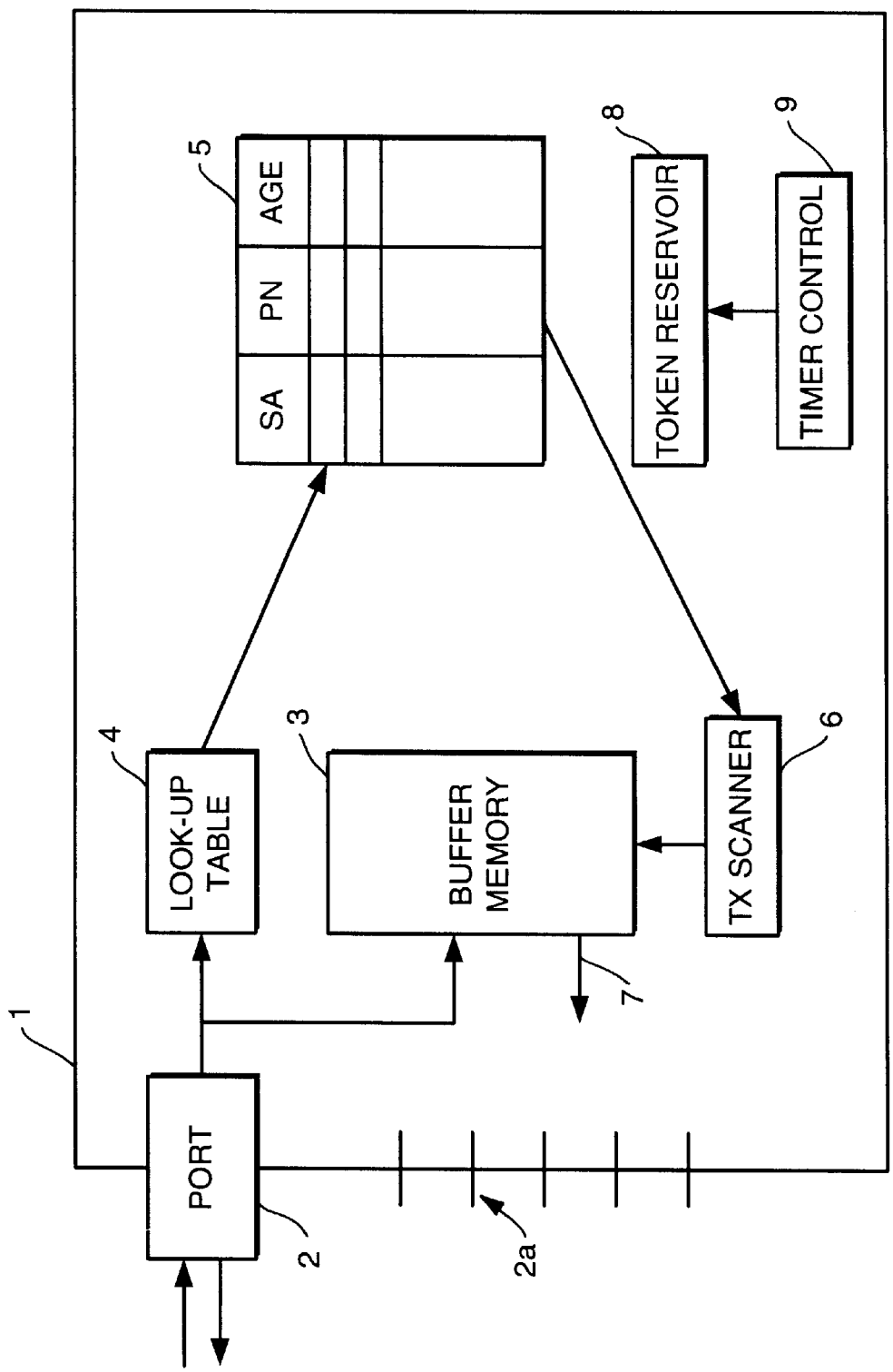
FIG. 1 illustrates in a conceptual manner a network switch which may be operated in accordance with the present invention.

FIG. 1 illustrates, in a deliberately simplified and conceptual manner, various elements in a network switch which has a multiplicity of ports on which frames can be received and from which frames can be dispatched selectively according to destination addresses constituted by relevant fields or bytes within each frame. The invention is particularly though not exclusively intended for use in a system operating according to the IEEE 802.1 transmission standard.

The switch shown in FIG. 1 is illustrated in simplified form partly because the invention is applicable, for example, to existing commercially available switches, such as switch types LS1000 and LS1100 made by 3Com Corporation.

The switch 1 shown in FIG. 1 has a multiplicity of ports of which the connection to only one port 2 will be specifically described; the other ports 2a will, as indicated hereinafter, be similarly coupled to the relevant blocks within the switch.

In this example, the port 2 is shown as a bidirectional port. Frames which are received at the port 2 are, in accordance with known practice, temporarily stored in a buffer memory 3 whence they may be read out according to a queueing scheme which is maintained and controlled by a program tool called herein 'transmit scanner' 6. The transmit scanner is required to ascertain the port number of the port on which a frame is to be dispatched (as purely schematically shown by arrow 7). Such information is obtained by means of another program tool, customarily called a 'look-up engine' 4, which performs look-ups in a 'forwarding database' 5. The ordinary process which a received frame undergoes includes therefore not only storage temporarily in the buffer memory 3 but also the extraction of the source address (SA) and the destination address (DA) which are customarily in a header part of the frame and the performance of look-ups using the extracted source address and destination address in conjunction with the look-up table.

If a match is found between the destination address of a frame and an entry in the data table is found, then the transmit scanner can provide the necessary control of the buffer memory to direct the frame to the port required.

If no match is found, then, customarily, the frame must be broadcast, that is to say transmitted on at least some and possibly all the ports of the switch. It is in general desirable to reduce the occupancy of bandwidth in the system by broadcast frames. It is well known to reduce the broadcast of frames throughout a network by the artificial partitioning of a network into 'virtual' local area networks, the virtual local area network to which a user belongs being identified in the form of a VLAN number in frames emanating from that user. Such an expedient is not sufficient by itself, since frames from a source within a particular virtual local area network are not necessarily destined for an address within the same virtual local area network. It follows that it is necessary to maintain the forwarding database to reduce the incidence of broadcast frames owing to the lack of an entry in the table.

It is desirable to mention at the present stage that it is customary to provide in the forwarding database an 'age' field indicating a 'system' age at which the entry was made and to remove routinely entries from the database where the 'age' of entries differs from a current indication of system age. Such a 'housekeeping' operation is necessary to prevent the occupancy of the available storage space on entries which are unused. For example, 'system' age may be defined as a two-bit field which is changed under software control at appropriate intervals. Such intervals may be comparatively long (such as fifteen or thirty minutes) or comparatively short (such as a few seconds or less). When an entry is made in the database, the accompanying age field is entered according to the relevant current system age (such as 00, 01 etc). Thus when the age is currently '10', the entries having the ages denoted 00, 01 and 11 would be removed. Other schemes, where the age indication is a one-bit field or has more than two bits, are feasible. It is also feasible, if the age field comprises two or more bits, to consider ages as different only if their difference indicates at least two of the intervals at which the system age is changed. However it is more convenient to treat any difference between an age of an entry and the system age as significant and to alter the aforementioned intervals if required.

Thus, the entries in the forwarding database 5 each include a source address, a port number and an age field; other data which may be for a variety of purposes included in the entry is omitted for the sake of simplicity from the present description.

The switch as thus far described operates according to known procedures.

The present invention provides for a system of tokens and the performance of a source address look-up on the availability of a token for that purpose. Thus a switch according to the invention includes a token reservoir 8 (which may be a counter defined in software or hardware), of any suitable form. The content of the reservoir is incremented periodically by a timer control 9. Each time the timer control completes a cycle, which may of course be adjustable, a fixed or selectable number of tokens may be loaded into the reservoir 8. Each of the look-up engines (one for each port) is coupled to the token reservoir so that each time any look-up engine performs a source address look-up, the token reservoir is decremented by unity. Furthermore, any look-up engine is disabled from performing a source address look-up if the content of the token reservoir has been reduced to some datum (i.e. zero).

Such a facility may be realised in practice by a straight-forward modification of the software control of the look-up engine, it being necessary only to provide a system of replenishment of a count and a comparison, before a source address look-up is performed, of the count with the datum.

It may, if desired, be desirable to exclude one or more of the search engines from the token control, so that a source address look-up is performed for every frame received at such a port.

A further feature, which is the subject of our aforementioned co-pending application filed of even date herewith, is to make the up-dating of the forwarding table dependent on the age of the entry in the forwarding database. Such an expedient is feasible in practice because although it requires a performance of a source address look-up, the further bandwidth occupied by a write cycle to the memory may be saved.

As indicated previously, when a source address is looked up in the forwarding database, the 'age' field of the address is updated with the current age. The invention further envisages a comparison of the current indication of age with the age of the table entry. If the compared ages correspond, the updating of the entry may be inhibited, whereas if the ages differ the age field may be updated.

Figure 2:
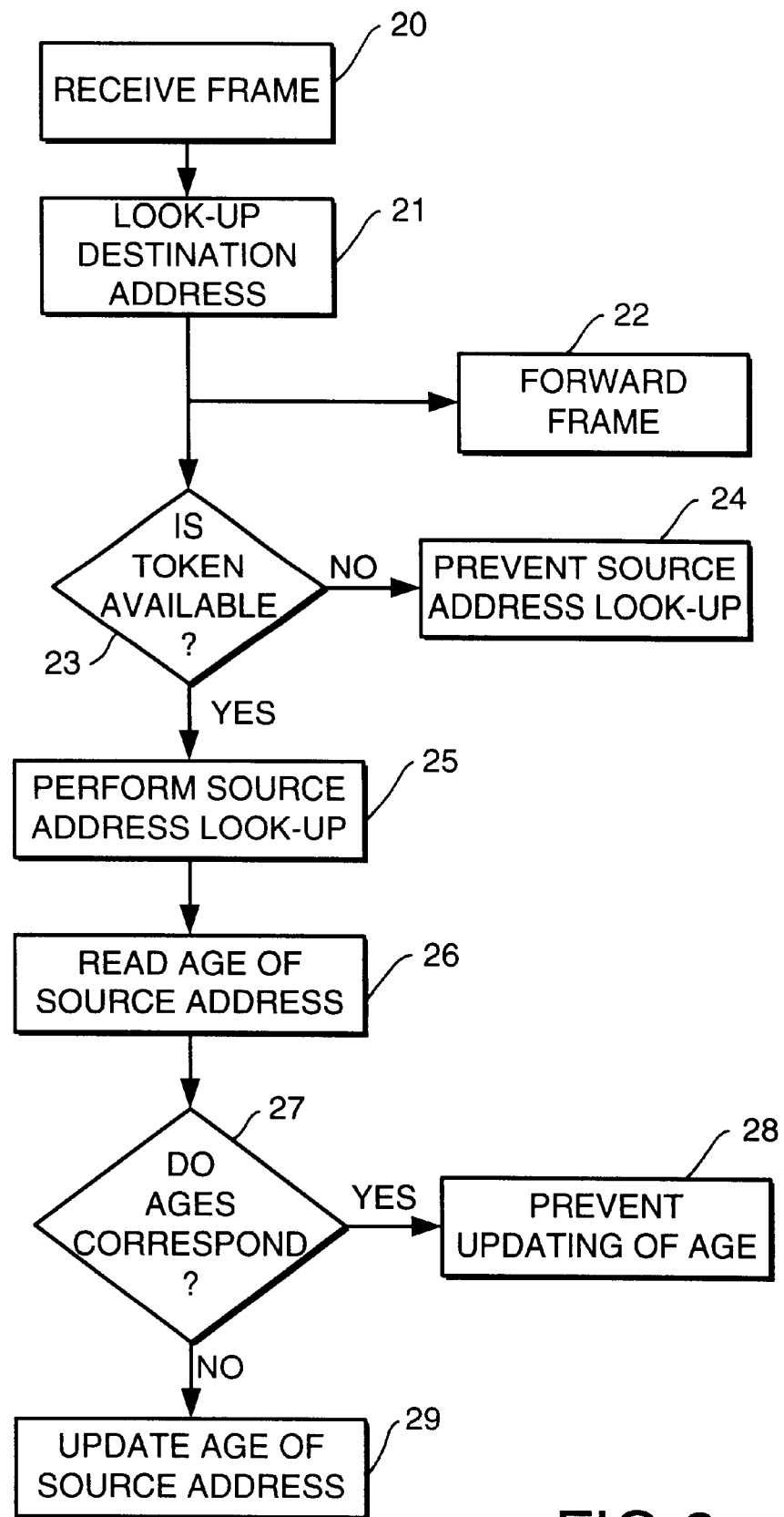
FIG. 2 is a flowchart for a look-up process in accordance with the invention.

FIG. 2 illustrates therefore the operation of a look-up scheme according to the invention. First, a frame is received (stage 20) and a first look-up of a destination address (stage 21) is performed. Subject to other controls (not relevant to the present invention), the frame is forwarded (stage 22) either to the port determined by the match of the destination address with a source address in the table or to a multiplicity of ports if no match be found.

Before the performance of a look-up of the source address, the look-up engine determines whether a token for the look-up (stage 23) is available. If no token be available, the source address look-up is prevented (stage 24). If a token is available, then the source address look-up is performed (stage 25).

The performance of the source address look-up includes the reading of the 'age' of the source address (stage 26). A comparison is made to determine whether the 'system' age corresponds to that of the age of the source address entry in the database.

As a result of the comparison of the age of the entry with a current system age (stage 27) the updating of the age may be prevented (stage 28). If the ages do not correspond, then the write cycle required for updating the age field will be performed (stage 29).

A useful modification to the scheme described above comprises disabling the process when the switch is powered up. Accordingly, all source addresses will be learnt (made the subject of entries in the forwarding database) for some period which may be selectable. This ensures that all addresses are in the forwarding database. Then the control process for the look-ups may be enabled. The described process facilitates the look-up of the source address table frequently enough to maintain the forwarding database without unnecessary sacrifice of the bandwidth which is required to ensure the destination addresses are looked up at 'wire-speed'.

What is claimed is:

1. A method of performing source address look-ups in a network switch which receives frames including source addresses and destination addresses and which includes a forwarding database containing entries each comprising a source address read from an incoming packet and a number identifying a port by which that frame has been received, the method comprising:

(a) performing a destination address look-up on the entries in the database for an incoming frame to determine whether the database contains an entry including a source address corresponding to the destination address of the received packet;

(b) performing a source address look-up through the entries in the database for the source address contained within a received frame;

(c) maintaining a token count;

(d) incrementing the token count from time to time;

(e) decrementing the token count when a source address look-up in the forwarding database is performed; and (f) inhibiting source address look-ups when the token count is reduced to a datum.

2. A method according to claim 1, wherein the incrementing step (d) includes replenishing the token count with a plurality of tokens.

3. A method according to claim 1, wherein the entries in the forwarding database each include a field denoting the age of an entry, the method further comprising:

(g) after performing a source address look-up, comparing the age of an entry with a current age;

(h) updating said entry in accordance with a current system age if the age field and the current age do not correspond; and (i) preventing updating of the age field when the age field and said current age correspond.

4. A method of performing look-ups in a forwarding database of a network switch, wherein the switch has a multiplicity of ports identified by numbers and wherein the switch reads a received frame to extract a source address and a destination address from the frame, performs a destination address look-up in the forwarding database to find a match between said destination address and a source address in the forwarding database, whereby the switch is enabled to dispatch the frame by way of the port associated with the matched source address in the forwarding database; said switch being further arranged to perform a source address look-up in the forwarding database so as to find a match between the source address read from the received frame and a source address in the forwarding database, and in the absence of such a match to make an entry of the source address read from the frame and the port number of the port on which that frame has been received; the method comprising:

(a) performing a look-up of a destination address in the forwarding database for every frame received; and (b) selectively inhibiting source address look-ups in the database whereby to make bandwidth available for destination address look-ups in the forwarding database.

5. A method for maintaining a forwarding database in a packet or frame-based switching network switch, said method comprising:

maintaining a forwarding database including at least a source address and port number for each database entry by writing new entries into the database corresponding to the source address of received packets or frames when such an entry is not already present in the database; and selectively inhibiting the rate of said writing of new entries when a pre-determined condition is met thereby providing an increased proportion of time for using the database to look up destination addresses.

6. A method as in claim 5 wherein said pre-determined condition corresponds to the lack of further available time-rationed tokens which have been made a pre-requisite for learning new source addresses in said database.

* * * * *